July 13, 1954     W. A. GEYGER     2,683,845
DAMPING CIRCUIT FOR MAGNETIC SERVO AMPLIFIERS
Filed July 23, 1953
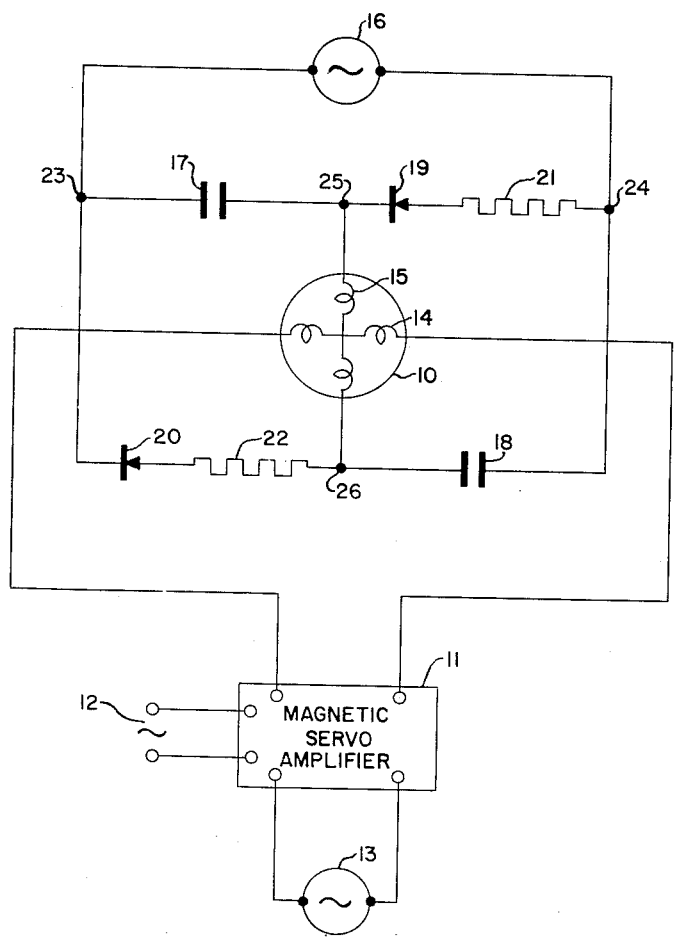
INVENTOR
W. A. GEYGER
BY
ATTORNEYS

UNITED STATES PATENT OFFICE 2,683,845

DAMPING CIRCUIT FOR MAGNETIC SERVO AMPLIFIERS

Wilhelm A. Geyger, Takoma Park, Md., assignor to the United States of America as represented by the Secretary of the Navy Application July 23, 1953, Serial No. 369,975

6 Claims. (Cl. 318—212)

(Granted under Title 35, U. S. Code (1952), sec. 266)

The invention described herein may be manufactured and used by or for the Government of the United States of America for governmental purposes without the payment of any royalties thereon or therefor.

This invention relates to a bridge type motor control circuit for magnetic amplifier control of small two-phase induction motors of a character possessing poor self-damping properties and incorporating light weight rotors.

More particularly, the invention comprises a novel and useful means of applying D.-C. damping to the field winding of small A.-C. motors of the type having some inherent braking but possessing relatively poor static damping properties.

Certain varieties of small two-phase induction motors used in high performance servo-mechanisms possess inherent damping characteristics. Included in this category are separately excited induction-meter type reversible motors, as frequently used in self-balancing potentiometer recorders and the like, types utilizing eddy current damping, as well as some types of low inertia squirrel-cage induction motors.

Prior arrangements for introducing braking of two-phase cage-rotor type motors have included the use of push-pull type electronic servo amplifiers.

The inventor has disclosed the principle of applying D.-C. damping in the field of magnetic amplifiers, preferably using full-wave circuitry, to supply a unidirectional control current to the control winding of the two-phase motor. This method is more fully described in the copending application, Serial No. 276,027, filed March 11, 1952. In this system, the A.-C. component of this unidirectional current is torque producing and the D.-C. component creates the desired dynamic braking effect. This method is suitable for the various types of motors possessing poor damping properties but is not entirely satisfactory for those motors having light weight rotors. This is due to the double frequency component occurring with the full-wave systems which tends to produce chatter or rotor vibration at the second harmonic frequency of the supply source.

It has been observed, however, that certain of these motor types exhibit severe rotor vibrations when damped by the prior systems and require additional damping. This is particularly true of certain of the types having inherent braking properties due to the special construction thereof, which when controlled by a magnetic amplifier circuit utilizing very high gain to obtain an extremely high static accuracy, require additional damping. It is a feature of this invention to provide a unidirectional damping current derived from the A.-C. power supply source for application through the line field winding during one half cycle and in opposition to the direction of A.-C. current flow through the same winding during the same half cycle.

One object of this invention is to provide improved braking for a reversible induction motor when controlled by a magnetic servo amplifier, which motor is of a character possessing some inherent dynamic braking characteristics.

Another object resides in the derivation of a unidirectional half-wave damping current for a magnetic amplifier controlled motor, from the same A.-C. supply source as applied to the motor line field and applying this half-wave damping current through a bridge circuit to the line field winding of the motor to provide improved braking characteristics therefor.

Other objects and many of the attendant advantages of this invention will be readily appreciated as the same becomes better understood by reference to the following detailed description when considered in connection with the accompanying drawings wherein the single figure is a schematic illustration of a motor control circuit for use with a magnetic servo amplifier.

Referring now to the figure, a small two-phase A.-C. motor is shown at 10 which is adapted for control from a magnetic amplifier indicated generally at 11. The line winding 15 of the motor 10 is connected across the output of a bridge circuit, hereinafter described in greater detail, which is energized from an A.-C. power supply source at 16.

The magnetic amplifier receives power from a suitable supply indicated at 12 and of the same phase as supply 16. It is controlled by an error signal source generally indicated at 13. The amplifier output is applied across the amplifier field windings 14 of the motor 10.

The bridge circuit is provided for application of a damping current to the line field windings 15 of the motor 10 and for contemporaneous A.-C. energization of the motor from the A.-C. power supply source at 16. The A.-C. supply 16 is applied across the bridge input at 23, 24 and provides for current flow through a circuit path which includes a pair of series connected phasing capacitors 17 and 18. The line field winding 15 is connected to one side of each of the capacitors 17 and 18 and across the bridge circuit output 25, 26. The capacitor valves are made twice as large as would be required for a single capacitor phasing element in a conventional circuit, due to the series connection thereof.

The bridge circuit for the line field winding additionally includes a pair of rectifier elements 19 and 20 connected asymetrically in series with the field and in respective sides of the bridge. These half-wave rectifiers may advantageously be of the selenium dry-disc variety. The rectifiers are connected in series with suitable resistors for regulation of damping current flow in opposite legs of the aforementioned bridge circuit. The rectifiers are connected in the circuit with the polarities thereof arranged to provide a unidirectional flow of damping current through the line field winding and to apply a damping effect to the motor during each half cycle of current flow through the rectifiers.

In operation, the motor is connected as shown in the figure, to provide A.-C. energization of the line field 15 thereof through the pair of phasing capacitors 17 and 18, with control of the amplifier field winding being derived from the magnetic servo amplifier 11, in a conventional manner.

Damping of a character tending to provide a constant braking effect and to prevent hunting and rotor chatter vibration at a static rotor condition is derived from the A.-C. power source by half cycle rectification through rectifiers 19 and 20. The development and regulation of the unidirectional current flowing through the rectifiers is provided by use of the series resistances 21 and 22, in each of two sides of the bridge. The use of two rectifiers 19 and 20 and two load resistors 21 and 22 together with the phasing capacitors 17 and 18 provides for a bridge input circuit across the A.-C. supply to the motor.

Obviously many modifications and variations are possible in the light of the above teachings. It is therefore to be understood that within the scope of the appended claims the invention may be practiced otherwise than as specifically described.

What is claimed as new and desired to be secured by Letters Patent of the United States is:

1. In a damping circuit for a controlled two-phase A.-C. motor having first and second field windings, a magnetic servo amplifier connected across one field winding, an A.-C. power source, a bridge circuit for applying a pulsating half cycle D.-C. braking current across the bridge output and through said second field winding during alternate half cycles of the power source, said bridge comprising a phasing capacitor in a first pair of opposite sides thereof, and a series connected rectifier and resistance element in each of a second pair of opposite sides of the bridge, each of said rectifiers being connected to permit current flow in the same direction therethrough.

2. A bridge circuit type energization and damping circuit for a two-phase induction type servomotor of a character having an amplifier field winding with the output of a magnetic amplifier connected thereto and a line field winding connected across the bridge circuit output, and a source of A.-C. power, said bridge circuit comprising a pair of phase shifting capacitors for producing a flow of alternating current from said source through the line field winding, and a pair of unidirectional conducting elements connected in opposite sides of the bridge in a manner to provide a flow of half wave damping current through the line field winding during one half cycle of the power source.

3. A motor damping circuit for a magnetic amplifier controlled two-phase induction motor having first and second field windings, a source of alternating current potential, a bridge circuit connected between said first field winding and said potential source for motor energization therefrom, said bridge circuit including a pair of rectifiers connected asymetrically in a first pair of sides thereof and in series with said first winding to provide a unidirectional damping current for said motor, said first winding being connected across said bridge output between said rectifiers, a pair of capacitance elements connected respectively in series on opposite sides of the first field winding and each in respective ones of a second pair of sides of the bridge circuit, and a magnetic servo amplifier connected for motor control with the output thereof across the second field winding.

4. In combination with a two-phase induction type servomotor of a character having two field windings, an A.-C. power source, a magnetic amplifier connected with the output thereof across one field winding of the motor, a damping-and-energization circuit for said other field winding comprising a bridge circuit means connected across said power source with said other field winding across the output thereof, said bridge including a phase shift network and rectification means, said phase shift network having a capacitive reactance element in each of a first pair of opposite sides of the bridge and in series connected relation through the bridge output, and said rectification means providing a pair of asymetrically connected semi-conductors disposed respectively in opposite sides of a second pair of sides of the bridge for providing a unidirectional half wave damping current to the said other winding through the bridge output.

5. In combination with a two-phase induction type servomotor of a character having a first field winding for control from a magnetic amplifier, a magnetic amplifier connected with the output thereof across said first field winding, a second field winding in said motor, an A.-C. power source, and bridge circuit means connected for energization from said power source and including said second field winding across the output thereof, said bridge circuit means comprising a damping network and an energization network for said second field winding, the damping network comprising a rectifying element in each of a first two opposite sides of the bridge and connected to provide unidirectional half wave flow through said second winding, and said energization network comprising a series capacitance in each of a second two opposite sides of the bridge.

6. The apparatus of claim 5 further characterized by the inclusion in said damping network of a series resistance connected in the pair of bridge sides in which the rectifying elements are incorporated.

No references cited.